United States Patent [19]

Smith

[11] 4,208,943
[45] Jun. 24, 1980

[54] MULTIGRIP FASTENER

[75] Inventor: Walter J. Smith, Waco, Tex.

[73] Assignee: Huck Manufacturing Company, Detroit, Mich.

[21] Appl. No.: 899,591

[22] Filed: Apr. 24, 1978

[51] Int. Cl.² ............................................. F16B 19/05
[52] U.S. Cl. .......................................... 85/7; 85/1 T; 85/5 R
[58] Field of Search ................. 85/7, 72, 77, 78, 1 T, 85/5 R; 151/2 A

[56] References Cited

U.S. PATENT DOCUMENTS

| 2,972,274 | 2/1961  | La Bombard et al. | 85/5 R X |
| 2,978,946 | 4/1961  | Looker            | 85/5 R   |
| 3,192,821 | 7/1965  | Siebol            | 85/7 X   |
| 3,230,818 | 1/1966  | Siebol            | 85/72 X  |
| 3,276,308 | 10/1966 | Bergere           | 85/72    |
| 3,792,933 | 2/1974  | Stencel           | 85/7 X   |
| 3,915,053 | 10/1975 | Ruhl              | 85/7     |

Primary Examiner—Rodney H. Bonck
Attorney, Agent, or Firm—Harness, Dickey & Pierce

[57] ABSTRACT

A unique two-part fastener consisting of a pin and a tubular member in which the pin has substantially identical annular grooves formed along a major portion thereof and in which the annular grooves provide combination grooves some of which functions as locking grooves, a selected one which functions as a breakneck groove and others which can function as the pull grooves with a unique relationship between the grooves and a swaged portion of the tubular member so that as the fastener is set, the pin will break off in a preselected one of the combination grooves within the outer end of the tubular member.

13 Claims, 5 Drawing Figures

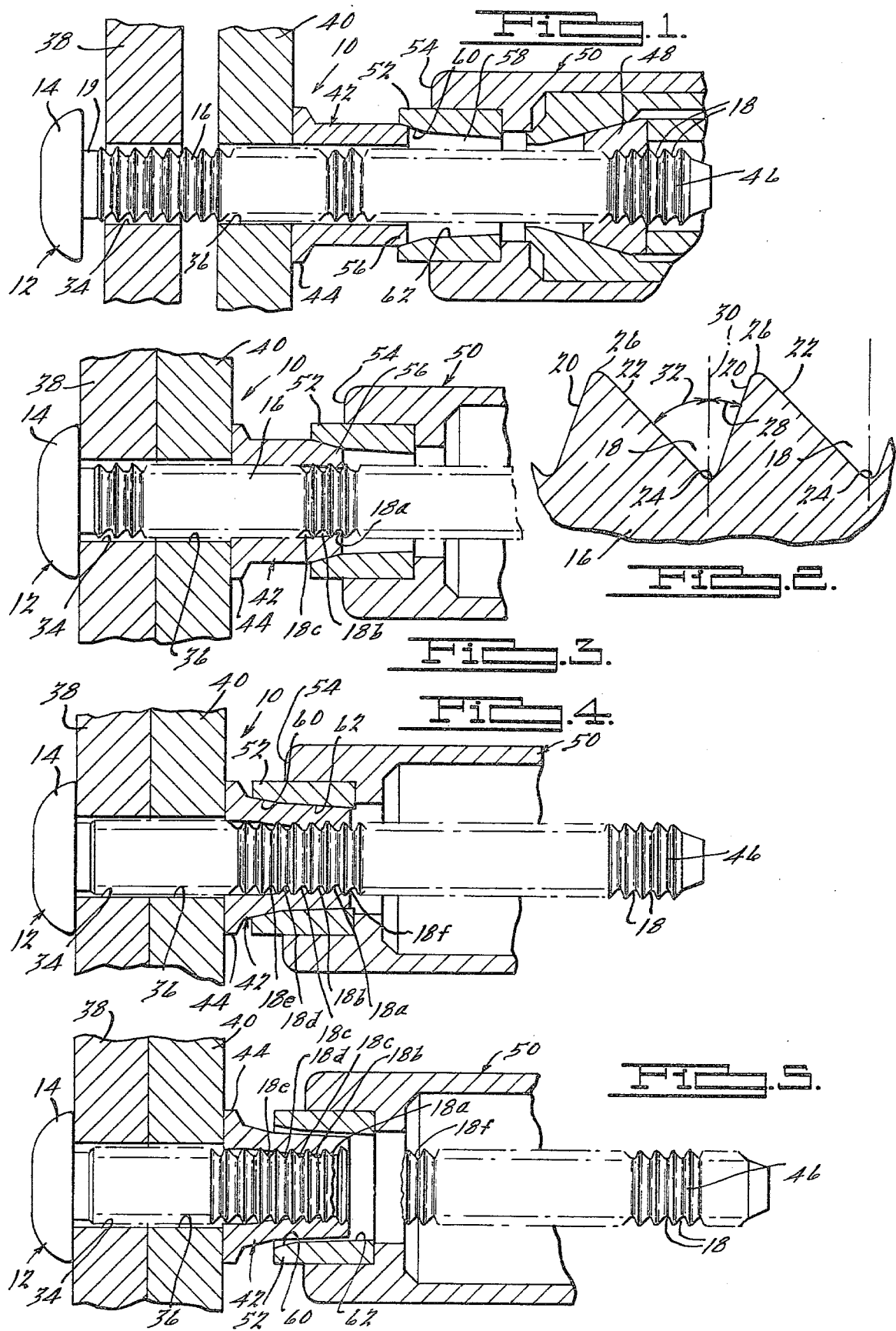

MULTIGRIP FASTENER

BACKGROUND AND SUMMARY OF THE INVENTION

The present invention relates generally to fasteners and more specifically to two piece fasteners which are adapted to be utilized in securing a broad range of material thicknesses.

In some applications it would be desirable to use a two piece fastener of the type employing a pin having combination locking and breakneck grooves and a tubular member adapted to be swaged thereto and in which any of these grooves is capable of functioning as a breakneck so as to enable a single fastener to be utilized over a broad range of material thicknesses. One problem with such a fastener is providing a structure in which the pin break will occur repeatedly and consistently in a desired one of the combination grooves.

This is accomplished by the present invention which utilizes a pin having a unique combination groove geometry. In addition, it is believed that the use of a selective relative hardness between the pin and associated tubular member further assists in the proper functioning of the fasteners. In the present invention, an axially directed force generated by the swaging of the tubular member into a preselected one of the combination grooves is utilized at a preselected groove which force when combined with pulling force applied by an installation tool will provide a combined tensile force at the selected groove whereby fracture will occur and hence that groove when selected functions as a breakneck. The groove geometry includes a pair of radially outwardly diverging sidewalls defining each groove, each of which sidewall forms a different angle with respect to a radial plane extending transversely through the pin member and controlled radius portions interconnecting adjacent end portions thereof.

Accordingly, the present invention provides an improved two piece fastener having combination locking and breakneck grooves which extend along the shank portion of the pin a distance at least equal to the length of the shank portion less the minimum material thickness for which such fastener is to be used. This invention thereby enables a single fastener to be utilized to secure materials having a wide variety of total thicknesses. This feature affords substantial cost savings to users of such fasteners both by reducing the number of different fasteners required to be purchased and carried in their inventory as well as increasing product reliability by reducing the likelihood of a fastener with an inappropriate gripping range being inadvertenly used.

Additional advantages and features of the present invention will become apparent from the subsequent description and the appended claims taken in conjunction with the accompanying drawings.

BRIEF DESCRIPTION OF THE DRAWINGS

FIG. 1 is a partially sectioned view of a fastener in accordance with the present invention shown in operative relation to a pair of workpieces and having an installation tool in initial engagement with the fastener;

FIG. 2 is an enlarged fragmentary sectioned view of a portion of the fastener pin of FIG. 1 illustrating the groove geometry of the present invention, the section being taken along an axial plane; and FIGS. 3 through 5 are a sequence of views each similar to FIG. 1 but illustrating the installation sequence from initial swaging of the tubular member through completed swage and pin break.

DESCRIPTION OF THE PREFERRED EMBODIMENT

Referring now to the drawings and in particular to FIGS. 1 and 2 thereof, there is illustrated a fastener indicated generally at 10 in accordance with the present invention and comprising a pin member 12 having a head 14 provided on one end thereof and an elongated shank portion 16.

Shank portion 16 has a plurality of substantially identical annular combination locking and breakneck grooves 18 extending along substantially the entire length thereof and may include a relatively short smooth cylindrical portion 19 immediately adjacent the juncture with head 14. While smooth cylindrical portion 19 is illustrated as being relatively short, it may extend up to a length equal to a predetermined minimum total material thickness with which fastener 10 is to be used. Thus, grooves 18 will extend along the length of shank 16 from a point greater than this predetermined minimum thickness. Each of grooves 18 is defined by radially outwardly diverging sidewalls 20 and 22 which are connected at their radially inner ends by a generally concave radiused portion 24. The radially outer end of sidewall 20 is inter-connected with the radially outer end of sidewall 22 of the next adjacent groove 18 by a generally convex radiused portion, or crest 26 and, in like manner, a substantially identical convex radiused portion 26 also connects the radially outer end of sidewall 22 with sidewall 20 of the next adjacent groove 18.

As best seen with reference to FIG. 2, sidewall 20 is disposed at a substantialy smaller angle 28 relative to a radial plane 30 extending transversely through the shank portion 16 than the angle 32 formed between sidewall 22 and radial plane 30. It has been found that the present invention provides satisfactory results when angle 28 is approximately 20° and angle 32 is approximately 45°.

Another important aspect of the present invention resides in the provision of the convex radiused portions 26 and concave radiused portions 24. It has been found that consistent results have been achieved with pin members having a shank diameter of approximately 0.25 inches when the concave radiused portions 24 have a radius no less than around 0.005 inches and are preferably in the range of from around 0.005 to about 0.010 inches. It has also been found that consistent results are achieved with such pin members when the convex radiused portions 26 have a radius less than around 0.010 inches. The selection of radii for portions 24 and 26 as noted promotes consistency in operation. As the pin diameter increases, the preferred range for concave radiused portion 24 will also increase in a substantially linear relationship maintaining a ratio in the range of approximately 50:1 to 50:2. Similarly with respect to the convex radiused portion, the allowable maximum radius may also increase in a substantially linear relationship to increasing diameter such that the ratio of pin diameter to convex radius is approximately a maximum of 50:2.

Referring now to FIGS. 1 and 3 through 5, it is seen that fastener 10 is designed to be inserted in aligned openings 34 and 36 provided in a pair of members 38 and 40, respectively, which are to be joined by fastener 10. A tubular member 42 in the form of a generally cylindrically shaped collar is placed on shank portion 16 with flanged end portion 44 thereof being brought into engagement with member 40. As shown, shank portion 16 is of a length substantially greater than the total thickness of members 38 and 40 plus the axial length of collar 42 thereby providing an end portion 46 also having combination grooves 18 which grooves may be engaged by jaws 48 of pulling tool 50.

Pulling tool 50 is of conventional construction having a swaging anvil 52 extending outwardly from the nose portion 54 of the tool 50; the jaws 48 are adapted to be moved rearwardly relative to anvil 52 as shown in the drawings. Anvil 52 of pulling tool 50 has a central frusto conically shaped opening 58 provided therein having a first relatively sharply tapered inner portion 60 and second tapered inner portion 62. It has been found that an anvil in which portion 60 is provided with a taper of approximately 31.5° relative to the axis thereof and extending inward a distance of about 0.090 inches and portion 62 is provided with a taper of approximately 7° relative to the axis thereof produces satisfactory results in setting fasteners of the present invention.

Actuation of pulling tool 50 will cause jaws 48 to engage and grip a predetermined number of combination grooves 18 and thereby exert a pulling or tensioning force upon pin 12 and against collar 42. During the initial stages of the pulling action, anvil 52 exerts an oppositely directed force on collar 42 thereby causing members 38 and 40 to be drawn into mutual engagement.

Thereafter, as best seen in FIG. 3, portion 60 of anvil 52 begins to deform or cause the outer end portion 56 of collar 42 to be extruded into a preselected one 18a of combination grooves 18. This initial deformation causes a locking action to occur between collar 42 and pin 12. Thereafter, continued movement of jaws 48 cause anvil 52 to move along collar 42 thereby causing the collar material to flow into combination grooves 18b, c, d, e and possibly others approaching members 38 and 40 as well as continuing to compress the collar material which has been swaged into groove 18a.

Because of the defined groove configuration, the continued compression and flow of the collar material into groove 18a causes an axially directed localized force to be exerted on sidewall 20 as a portion of the collar material experiences a backward extrusion or flowing to the right as seen in the drawings into the next outwardly disposed groove 18f. The axial component of swaging or material flow force developed by this continued compression and flow of the collar material in combination with the axial tension exerted by the pulling action of the jaws 48 will cause groove 18a to function as a breakneck with end portion 46 of pin 12 breaking thereat. As illustrated, groove 18a is desirably the outermost groove which is first filled with collar material.

As previously mentioned, concave radiused portion 24 is selected so as to provide an area of predetermined controlled stress concentration which facilitates fracture thereby enabling the present invention to repeatedly control the desired groove at which portion 46 of shank 16 separates. Also, radiused convex portion 26 operates to facilitate metal flow into groove 18a thereby assisting in providing control of the selection of the groove at which fracture occurs.

The relative hardness of collar 42 with respect to pin 12 has also been found to be a contributing factor in the operation of the present invention in producing a commercially acceptable joint. A collar having too high a hardness relative to a given pin hardness will not provide sufficient metal flow to enable the generation of axial forces from metal flow within groove 18a. An excessively soft collar may operate to produce satisfactory pin breaking action but the resulting joint may then have insufficient strength to be commercially acceptable or practical. It has been found that with pin members 12 fabricated from steel and having a hardness in the range of approximately $15R_C$ to $25R_C$ a collar having a hardness in the range of approximately $45R_B$ to $65R_B$ produced satisfactory results.

It should be noted that in the present invention the total tensile load required to effect pin break of the fastener when installed in combination with the tubular member will be lower than the tensile load required to effect pin break thereof without the cooperation of the tubular member.

In summary, the present invention comprises the concepts of the utilization of a pin having a plurality of similarly constructed grooves which function both as locking and breakneck grooves and in which the groove shape including the desired radiused portions provides a means whereby any one of the grooves located at a selected location proximate the outer end of the collar will function as a breakneck. In addition to the above, a desired relative pin and collar hardness assists in producing the desired result. This ability to consistently control the groove at which fracture occurs enables a single fastener to be manufactured which can accommodate a very broad range of material thicknesses.

It should also be noted that while the present invention has been described with reference to a two piece fastener having a pin and swageable collar, the principles are also applicable to fabrication of a blind fastener in which tubular member 42 may be in the form of a cylindrical sleeve having an outer portion adapted to be swaged to a pin in a manner similar to that described above.

While it will be apparent that the preferred embodiment of the invention disclosed is well calculated to provide the advantages and features above stated, it will be appreciated that the invention is susceptible to modification, variation and change without departing from the proper scope or fair meaning of the subjoined claims.

I claim:

1. In a two piece fastener for fastening a plurality of workpieces together with the workpieces having a thickness varying from a determinable minimum to a determinable maximum thickness, comprising a pin member having a head and a shank portion having a plurality of grooves thereon and a tubular member adapted to be swaged into locking engagement into the shank portion of the pin member by means of a tool having a swaging anvil adapted to engage the tubular member and gripping means adapted to grip the shank portion, the tool being actuable to apply a relative axial tensile force between the pin member and the tubular member whereby the tubular member is swaged into a predetermined number of said plurality of grooves of the shank portion of the pin member, said predetermined number of said grooves being substantially identical annular combination locking and breakneck grooves, each of said predetermined number of said grooves being defined by first and second radially outwardly diverging sidewalls, said first sidewall being positioned closer to said head than said second sidewall and forming an included angle with a radial plane extending transversely through said shank greater than the angle formed by said second sidewall, the improvement comprising the juncture of said diverging sidewalls at each of the grooves being defined by a concave radius portion interconnecting the radially inner ends of said first and second sidewalls, a convex radius portion interconnecting a said second sidewall of one of the grooves and a said first sidewall of an immediately adjacent one of the grooves, a selected one of the grooves being located at a predetermined location proximate the outer end of the tubular member and adapted to receive the material of the tubular member as it is swaged onto the shank portion, said first and second sidewalls being angulated such as to provide a relative axial force between said sidewalls in said selected one of the grooves, said force being generated by the material of the tubular member as it is swaged therein, whereby said relative axial force will be additive with the relative axial tensile force applied by the tool such that the shank portion will fracture at said selected one of the grooves, said concave radius portion being of a magnitude selected to provide a predetermined stress concentration to facilitate fracture at said selected one of the grooves in response to the combination of said relative axial force and said relative axial tensile force, said convex radius portion being of a magnitude selected to facilitate a desired flow of material during swaging of the tubular member, any one of the grooves being capable of functioning as said selected one of the grooves when located at said predetermined location while said pulling tool exerts the relative axial tensile force on the pin member.

2. The improvement of claim 1 wherein said selected one of the grooves is the first of the grooves adjacent the outer end of the tubular member to be filled by swaging of the tubular member.

3. The improvement of claim 1 wherein the tubular member has a preselected hardness less than the pin member and related thereto such that said tubular member has a hardness in the range of approximately from $45R_B$ to $65R_B$ when said pin has a hardness in the range of approximately from $15R_C$ to $25R_C$ so as to thereby provide controlled flow of the swaged material of the tubular member whereby fracture will occur at said selected one of the grooves.

4. The improvement as set forth in claim 3 wherein the tubular member comprises a collar located on the shank portion of the pin on the side of the workpiece opposite the pin head.

5. In a two piece fastener for fastening a plurality of workpieces together with the workpieces having a thickness varying from a determinable minimum to a determinable maximum thickness, comprising a pin member having a head and a shank portion having a plurality of grooves thereon and a tubular member adapted to be swaged into locking engagement onto the shank portion of the pin member by means of a tool having a swaging anvil adapted to engage the tubular member and gripping means adapted to grip the shank portion, the tool being actuable to apply a relative axial tensile force between the pin member and the tubular member whereby the tubular member is swaged into a predetermined number of said plurality of grooves of the shank portion of the pin member, said predetermined number of said grooves being substantially identical annular combination locking and breakneck grooves, each of said predetermined number of said grooves being defined by first and second radially outwardly diverging sidewalls, said first sidewall being positioned closer to said head than said second sidewall and forming an included angle with a radial plane extending transversely through said shank greater than the angle formed by said second sidewall, the improvement comprising the juncture of said diverging sidewalls at each of the grooves being defined by a concave radius portion interconnecting the radially inner ends of said first and second sidewalls, a convex radius portion interconnecting a said second sidewall of one of the grooves and a said first sidewall of an immediately adjacent one of the grooves, a selected one of the grooves being located at a predetermined location proximate the outer end of the tubular member and adapted to receive the material of the tubular member as it is swaged onto the shank portion, said first and second sidewalls being angulated such as to provide a relative axial force between said sidewalls in said selected one of the grooves, said force being generated by the material of the tubular member as it is swaged therein, whereby said relative axial force will be additive with the relative axial tensile force applied by the tool such that the shank portion will fracture at said selected one of the grooves, said concave radius portion having a minimum radius related to the diameter of the pin member by the ratio of around 1:50 so as to provide a predetermined stress concentration to facilitate fracture at said selected one of the grooves, said convex radius portion being of a magnitude selected to facilitate a desired flow of material during swaging of the tubular member, any one of the grooves being capable of functioning as said selected one of the grooves when located at said predetermined location while said pulling tool exerts the relative axial tensile force on the pin member.

6. In a two piece fastener for fastening a plurality of workpieces together with the workpieces having a thickness varying from a determinable minimum to a determinable maximum thickness, comprising a pin member having a head and a shank portion having a plurality of grooves thereon and a tubular member adapted to be swaged into locking engagement onto the shank portion of the pin member by means of a tool having a swaging anvil adapted to engage the tubular member and gripping means adapted to grip the shank portion, the tool being actuable to apply a relative axial tensile force between the pin member and the tubular member whereby the tubular member is swaged into a predetermined number of said plurality of grooves on the shank portion of the pin member, said predetermined number of said grooves being substantially identical annular combination locking and breakneck grooves, each of said predetermined number of said grooves being defined by first and second radially outwardly diverging sidewals, said first sidewall being positioned closer to said head than said second sidewall and forming an included angle with a radial plane extending transversely through said shank greater than the angle formed by said second sidewall, the improvement comprising the juncture of said diverging sidewalls at each of the grooves being defined by a concave radius portion interconnecting the radially inner ends of said first and second sidewalls, a crest portion interconnecting a said second sidewall of one of the grooves and a said first sidewall of an immediately adjacent one of the grooves, a selected one of the grooves being located at a predetermined location proximate the outer end of the tubular member and adapted to receive the material of the tubular member as it is swaged onto the shank portion, said first second sidewalls being angulated such as to provide a relative axial force between said sidewalls in said selected one of the grooves, said force being generated by the material of the tubular member as it is swaged therein, whereby said relative axial force will be additive with the relative axial tensile force applied by the tool such that the shank portion will fracture at said selected one of the grooves, said concave radius portion having a radius related to the pin diameter in a range of between the ratio of around 1:50 and around 2:50 so as to provide a predetermined stress concentration to facilitate fracture at said selected one of the grooves, and crest portion being of a contour selected to facilitate a desired flow of material during swaging of the tubular member, any one of the grooves being capable of functioning as said selected one of the grooves when located at said predetermined location while said pulling tool exerts the relative axial tensile force on the pin member.

7. In a two piece fastener for fastening a plurality of workpieces together with the workpieces having a thickness varying from a determinable minimum to a determinable maximum thickness, comprising a pin member having a head and a shank portion having a plurality of grooves thereon and a tubular member adapted to be swaged into locking engagement onto the shank portion of the pin member by means of a tool having a swaging anvil adapted to engage the tubular member and gripping means adapted to grip the shank portion, the tool being actuable to apply a relative axial tensile force between the pin member and the tubular member whereby the tubular member is swaged into a predetermined number of said plurality of grooves of the shank portion of the pin member, said predetermined number of said grooves being substantially identical annular combination locking and breakneck grooves, each of said predetermined number of said grooves being defined by first and second radially outwardly diverging sidewalls, said first sidewall being positioned closer to said head than said second sidewall and forming an included angle with a radial plane extending transversely through said shank greater than the angle formed by said second sidewall, the improvement comprising the juncture of said diverging sidewalls at each of the grooves being defined by a concave radius portion interconnecting the radially inner ends of said first and second sidewalls, a convex radius portion interconnecting a said second sidewall of one of the grooves and a said first sidewall of an immediately adjacent one of the grooves, a selected one of the grooves being located at a predetermined location proximate the outer end of the tubular member and adapted to receive the material of the tubular member as it is swaged onto the shank portion, said first and second sidewalls being angulated such as to provide a relative axial force between said sidewalls in said selected one of the grooves, said force being generated by the material of the tubular member as it is swaged therein, whereby said relative axial force will be additive with the relative axial tensile force applied by the tool such that the shank portion will fracture at said selected one of the grooves, said concave radius portion being of a magnitude selected to provide a predetermined stress concentration to facilitate fracture at said selected one of the grooves, said convex radius portion having a maximum radius relative to the pin diameter in the ratio of approximately 2:50 so as to facilitate a desired flow of material during swaging of the tubular member, any one of the grooves being capable of functioning as said selected one of the grooves when located to said predetermined location while said pulling tool exerts the relative axial tensile force on the pin member.

8. A fastener for securing together a plurality of workpieces having a thickness varying from a determinable minimum to a determinable maximum thickness and with the fastener adapted to be set by a relative pulling force from a pulling tool, said fastener comprising a pin member and a tubular member, said pin member having a head and a shank portion of a preselected length greater than said predetermined maximum to facilitate gripping by a jaw structure on the pulling tool, said tubular member adapted to be engaged by an anvil on the pulling tool and to be swaged thereby into locking engagement with said shank portion of said pin member as the pulling tool is actuated to apply a relative axial force between said pin member and said tubular member, a plurality of substantially identical annular combination locking and breakneck grooves provided along a portion of the length of said shank portion, each of said grooves being defined by first and second radially outwardly diverging sidwalls, said first sidewall inclined radially outwardly towards said head and forming an included angle with a radial plane extending transversely through said shank portion of around 45°, said second sidewall inclined radially outwardly away from said head and forming an included angle with said radial plane of around 20°, a concave radius portion interconnecting the radially inner ends of said first and second sidewalls and having a radius related to the diameter of said pin member by a ratio between approximately 1:50 and 2:50, each of said second sidewalls of one of said grooves being inter-connected with one of said first sidewalls of an immediately adjacent groove with a convex radius portion having a radius related to the pin diameter by a ratio no greater than 2:50, whereby a portion of said tubular member is swaged into locking engagement with determinable ones of said combination grooves while the jaw structure of the pulling tool grips a portion of said shank and exerts a relative axial force between said pin member and said tubular member, a selected one of said determinable ones of said combination grooves being located at a predetermined location proximate the outer end of said tubular member and adapted to receive the material of the tubular member as it is swaged onto the shank portion, the angulation of said first and second sidewalls providing a relative axial force between said sidewalls in said selected one of said combination grooves caused by the material of said tubular member as it is swaged thereon whereby said relative axial force will be additive with the relative axial tensile force applied by the tool such that said shank portion will fracture at said selected one of said combination grooves proximate the outer end of said tubular member.

9. The improvement of claim 8 wherein the tubular member has a preselected hardness less than the pin member and related thereto such that said tubular member has a hardness in the range of approximately from $45R_B$ to $65R_B$ when said pin has a hardness in the range of approxiamtely from $15R_C$ to $25R_C$ so as to thereby provide controlled flow of the swaged material of the tubular member whereby fracture will occur at said selected one of the grooves.

10. The improvement as set forth in claim 9 wherein the tubular member comprises a collar located on the shank portion of the pin on the side of the workpiece oppposite the pin head.

11. In a two piece fastener for fastening a plurality of workpieces together with the workpieces having a thickness varying from a determinable minimum to a determinable maximum thickness, comprising a pin member having a head and a shank portion having a plurality of grooves thereon and a collar member adapted to be swaged into locking engagement onto the shank portion of the pin member by means of a tool having a swaging anvil adapted to engage the collar member and gripping means adapted to grip the shank portion, the tool being actuable to apply a relative axial tensile force between the pin member and the collar member whereby the collar member is swaged into a predetermined number of said plurality of grooves of the shank portion of the pin member, said predetermined number of said grooves being substantially indentical annular combination locking and breakneck grooves, each of said predetermined number of said grooves being defined by first and second radially outwardly diverging sidewalls, said first sidewall being positioned closer to said head than said second sidewall and formng an include angle with a radial plane extending transversely through said shank greater than the angle formed by said second sidewall, the improvement comprising the juncture of said diverging sidewalls at each of the grooves being defined by a concave radius portion interconnecting the radially inner ends of said first and second sidewalls, a crest portion interconnecting a said second sidewall of one of the grooves and a said first sidewall of an immediately adjacent one of the grooves, a selected one of the grooves being located at a predetermined location proximate the outer end of the collar member and adapted to receive the material of the collar member as it is swaged onto the shank portion, said first and second sidewalls being angulated such as to provide a relative axial force between said sidewalls in said selected one of the grooves, said force being generated by the material of the collar member as it is swaged therein, whereby said relative axial force will be additive with the relative axial tensile force applied by the tool such that the shank portion will fracture at said selected one of the grooves, said concave radius portion having a radius related to the pin diameter in a range of between the ratio of around 1:50 and around 2:50 so as to provide a predetermined stress concentration to facilitate fracture at said selected one of the grooves in response to the combination of said relative axial force and said relative axial tensile force, said crest portion being of a contour selected to facilitate a desired flow of material during swaging of the tubular member, any one of the grooves being capable of functioning as said selected one of the grooves when located at said predetermined location while said pulling tool exerts the relative axial tensile force on the pin member and said collar member has a hardness related to the hardness of said pin such that said collar member has a hardness in the range of approximately from $45R_B$ to $65R_B$ when said pin has a hardness in the range of approximately from $15R_C$ to $25R_C$.

12. A fastener for securing together a plurality of workpieces having a thickness varying from a determinable minimum to a determinable maximum thickness and with the fastener adapted to be set by a relative pulling force from a pulling tool, said fastener comprising a pin member and a tubular member, said pin member having a head and a shank portion of a preselected length greater than said predetermined maximum to facilitate gripping by a jaw structure on the pulling tool, said tubular member adapted to be engaged by an anvil on the pulling tool and to be swaged thereby into locking engagement with said shank portion of said pin member as the pulling tool is actuated to apply a relative axial force between said pin member and said tubular member, a plurality of substantially identical annular combination locking and breakneck grooves provided along a portion of the length of said shank portion, each of said grooves being defined by first and second radially outwardly diverging sidewalls, said first sidewall inclined radially outwardly towards said head and forming a first included angle with a radial plane extending transversely through said shank portion, said second sidewall inclined radially outwardly away from said head and forming a second included angle with said radial plane said first angle being greater than said second angle, a concave radius portion interconnecting the radially inner ends of said first and second sidewalls and having a radius related to the diameter of said pin member by a ratio between approximately 1:50 and 2:50, each of said second sidewalls of one of said grooves being interconnected with one of said first sidewalls of an immediately adjacent groove with a convex radius portion having a radius related to the pin diameter by a ratio no greater than 2:50, whereby a portion of said tubular member is swaged into locking engagement with determinable ones of said combination grooves while the jaw structure of the pulling tool grips a portion of said shank and exerts a relative axial force between said pin member and said tubular member, a selected one of side determinable ones of said combination grooves being located at a predetermined location proximate the outer end of said tubular member and adapted to receive the material of the tubular member as it is swaged into the shank portion, the angulation of said first and second sidewalls providing a relative axial force between said sidewalls in said selected one of said combination grooves caused by the material of said tubular member as it is swaged thereon whereby said relative axial force will be additive with the relative axial tensile force applied by the tool such that said shank portion will fracture at said selected one of said combination grooves proximate the outer end of said tubular member.

13. The improvement of claim 12 wherein said tubular member is a collar and said collar has a hardness related to the hardness of said pin such that said collar has a hardness in the range of approximately from $45R_B$ to $65R_B$ when said pin member has a hardness in the range from approximately $15R_C$ to $25R_C$.

* * * * *

UNITED STATES PATENT AND TRADEMARK OFFICE
CERTIFICATE OF CORRECTION

PATENT NO. : 4,208,943
DATED : June 24, 1980
INVENTOR(S) : Walter J. Smith

It is certified that error appears in the above–identified patent and that said Letters Patent are hereby corrected as shown below:

Abstract, line 5, "functions" should be --function--;

Col. 4, line 55, (Claim 1) "into" (second occurrence) should be --onto--;

Col. 7, line 2, (Claim 6) after "first" insert --and--;

Col. 8, line 3, (Claim 7) "to" should be --at--;

Col. 9, line 25, (Claim 11) "include" should be --included--.

Signed and Sealed this

Twenty-third Day of September 1980

[SEAL]

Attest:

SIDNEY A. DIAMOND

Attesting Officer

Commissioner of Patents and Trademarks